Sept. 3, 1968         J. E. DORNFELD ET AL         3,400,312
STACKED MICA CAPACITOR HAVING A MULTIPLE VALVE MICA FILM
Filed Sept. 6, 1966
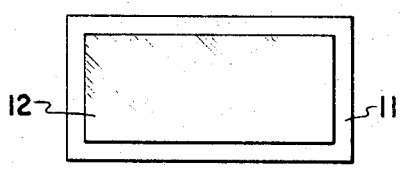
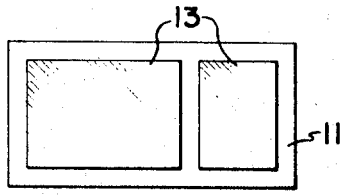
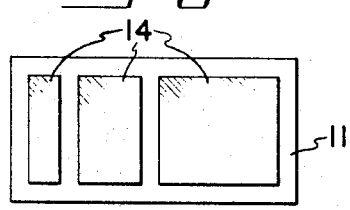
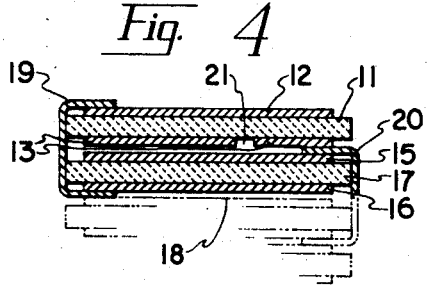
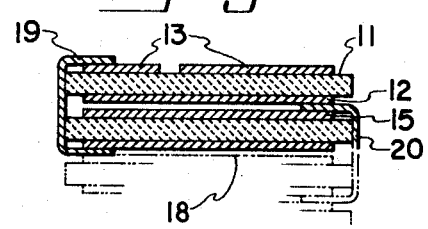
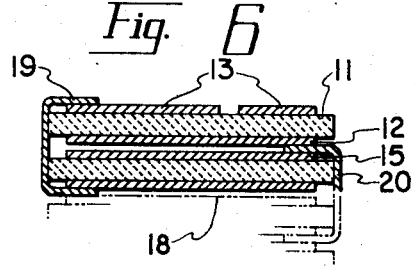

United States Patent Office 3,400,312
Patented Sept. 3, 1968

3,400,312
STACKED MICA CAPACITOR HAVING A
MULTIPLE VALUE MICA FILM
John E. Dornfeld, Mequon, and Jack Greenberg, Whitefish Bay, Wis., assignors to Sprague Electric Company, North Adams, Mass., a corporation of Massachusetts
Filed Sept. 6, 1966, Ser. No. 578,110
3 Claims. (Cl. 317—258)

ABSTRACT OF THE DISCLOSURE

The capacitance of a stack of electroded mica films is adjusted by the inclusion of a multiple-value mica film having a substantially maximum area electrode on one surface and a plurality of smaller isolated electrodes on the other surface. Varied capacitance values for the stack are obtained by different orientations of the several electrodes of the multiple-value mica film.

The present invention relates to stacked mica electrical capacitors and more particularly to a multiple capacitance value mica film suitable for positive variation of stacked mica capacitor ratings.

Variation and adjustment of capacitance values for fixed stacked mica capacitors is conventionally accomplished by methods which may be generally classed as subtractive. Thus, if a stacked unit must be adjusted to a specific value some portion of its electrode surface is removed, usually by abrasion, until the desired value is achieved. If the capacitor need be adjusted upward, the only manner of so doing is to add another full plate and then abrade until the desired value is achieved.

It is therefore an object of the present invention to provide a means of varying the capacitance of a stacked mica capacitor by addition or substitution rather than subtraction.

Other objects and advantages of the present invention will be made obvious to those skilled in the art by the following description when considered in relation to the accompanying drawing of which:

FIGURE 1 is a plan view of one planar surface of all mica films of the invention;

FIGURE 2 is a plan view of the opposing planar surface of the mica film of FIGURE 1 according to one embodiment of the invention;

FIGURE 3 is a plan view of the opposing planar surface of the mica film of FIGURE 1 according to a second embodiment of the invention;

FIGURE 4 is a sectional view of the mica film depicted in FIGURE 2 oriented upon the uppermost electrode surface of a schematically represented stacked capacitor such that upon compressing into the stack said film will deliver its maximum capacitance value;

FIGURE 5 is a sectional view of the mica film in FIGURE 2 oriented such that upon compression into the stack said film will add a small capacitance value; and FIGURE 6 is a sectional view of the mica film depicted in FIGURE 2 oriented such that upon compression into the stack said film will add an intermediate capacitance value.

According to the present invention there is provided a multiple value adder-plate which, depending on its orientation in a stacked capacitor, adds determined increments to the capacitance of a stacked capacitor unit.

More particularly, the present invention provides an adder-plate consisting of a single planar mica sheet having an electrode pattern of a maximum preferred effective area deposited on one planar surface thereof and isolated electrode patterns of varying area on the other planar surface. When the adder-plate is placed in proper orientation and connection with a stacked capacitor unit, varied capacitance values are obtained by different orientations of the patterns. The adder-plate is of a size and shape which makes it readily adaptable by addition to conventional stacked capacitors.

Referring to the drawing, FIGURE 1 shows a mica sheet 11 having deposited upon its face a conductive metal electrode 12. In all of the embodiments of this invention one surface of the adder-plate will have deposited thereon an electrode of the largest effective area possible or preferred. This area will normally be the same as that of the electrodes of the stacked capacitor. It may, however, be of any preferred area so long as sufficient dielectric margins are provided. Thus electrode 12 represents the maximum effective electrode area which the adder-plate may provide.

FIGURES 2 and 3 show electrode configurations which may be applied to the opposing surface of mica film 11. FIGURE 2 shows a dual configuration of electrode 13 having an area ratio of 2:1 deposited upon mica sheet 11. FIGURE 3 similarly shows a configuration of three electrodes 14 having an area ratio of 1:2:3 deposited upon the mica sheet 11. In both cases, there is deposited upon the opposing surface of mica sheet 11 the maximum electrode area 12 of FIGURE 1.

FIGURE 4 shows the adder-plate of FIGURE 2 in position to be compressed into a stacked capacitor whose uppermost electrodes 15 and 16 and uppermost dielectric film 17 are shown resting upon a schematic representation of the remainder of the unit 18 as shown in phantom. In this configuration, full sized electrode 12 deposited upon mica film 11 is contacted by an interconnecting conductor 19 which usually consists of a thin metal foil. The isolated electrode members 13 lie in position just above the uppermost electrode surface 15 of the stack, and in this non-compressed orientation the two sets of electrodes are separated only by the second interconnecting conductor member 20 which is also usually a foil.

In order to achieve full integration of the adder-plate of FIGURE 4 into the capacitor stack, it must be compressed into the stacked unit. In the compressed configuration the uppermost stack electrode 15 will serve, along with conductor 20, to connect all of the isolated electrode members 13 together thus providing a unified electrode surface of the same overall area as electrode 12 or an active capacitance area equal to the area of electrode 12. The small air pockets such as that which will occur at 21 produce a negligible effect and as the compression of the adder-plate and capacitor unit increase their effectiveness decreases. Thus, in the compressed structure the adder-plate will provide an additional capacitance value equal to that of any other single plate of the stack or the maximum value attainable by the adder-plate.

FIGURE 5 shows the adder-plate in an inverted orientation. The adder-plate electrode 12 is now in position directly above the uppermost stack electrode 15 and in contact with interconnector 20. The isolated electrode configuration 13 faces upward and only a portion thereof is actually integrated into the capacitor circuit by connection to interconnector 19.

In this configuration, no compression would be needed to achieve the desired capacitance addition since electrode 12 provides an affective area larger than the electrode area contacted upon the opposing surface by interconnector 19. Simple contact between electrodes 12 and 15 which is provided by interconnector 20 provides an effective electrode surface of sufficient size to register with the contacted portion of electrode configuration 13. Compression is effected however to provide a more compact and stronger unit, and to achieve full physical integration of the adder-plate.

The FIGURE 5 configuration provides a capacitance addition which is the minimum the adder-plate may provide. The value will be approximately ⅔ that attained in the FIGURE 4 configuration, since the effective electrode area is now ⅔ that of electrode 12.

FIGURE 6 shows the adder-plate in a new orientation achieved by rotating the plate 180° in the horizontal plane from its position in FIGURE 5. Again electrode 12 contacts interconnector 20, and now the second portion of electrode configuration 13 contacts interconnector 19. In this orientation the capacitance value added to the stack is approximately 4/7 that achieved by the orientation of FIGURE 4, or twice that resulting from the arrangement in FIGURE 5, due to the relative effective electrode area integrated into the stacked capacitor circuit. Thus, this third orientation achieves an intermediate value. Once again compression of adder-plate 11 into the stack will follow for the reasons set forth above.

By increasing or decreasing the area of the isolated electrode portions 13 or 14 occurring on the multi-patterned surface of the film 11 any number of variations may be achieved.

A number of plates suitable for adding fixed capacitance increments provides a rapid and economical means of adjusting the value of a capacitor to within a desired capacitance range. Should negative or downward adjustment be needed, removal of a standard stack plate and substitution of an adder-plate of this invention provides the necessary variation.

In this way the time consuming abrasion process can be eliminated, and a simple addition process substituted therefor.

It is thus clear that the concept of this invention is open to almost endless modification. The area of the isolated electrode portions may be varied according to the capacitance value which is to be added to the stacked capacitor. By increasing the length and/or width of the interconnecting foil 19 a plurality of the isolated electrode portions may be integrated into the stacked capacitor circuit.

By varying the number of isolated electrode area deposited upon the film, the number of different capacitance values attainable with a single film in a variety of orientations is increased.

The concept is further expandable to varying the overall shape of the mica film so as to make it adaptable to stacked units of varied peripheral shape. With each increase in the number of edges on the plate a corresponding increase in the number of accessible electrode portions, orientations, consequent capacitance values also occurs.

Since it is obvious that many modifications and changes can be made in the above described details without departing from the nature and spirit of the invention, it is to be understood that the inventin is not limited to said details except as set forth in the appended claims.

What is claimed is:

1. A stacked mica capacitor comprising a stack of a plurality of mica films, each of said films having an electrode of substantially maximum effective area on a surface thereof, a conductor member interconnecting selected ones of said electrodes, a multiple capacitance value mica film comprising a single planar mica sheet having a conductive metal electrode of said substantially maximum effective area deposited upon one planar surface thereof and a plurality of smaller isolated conductive metal electrodes upon the opposing planar surface all in registration with said maximum effective electrode, and said multiple value film being in contact with the uppermost electrode surface of said stack and said interconnecting conductor member of said stack.

2. The mica film of claim 1 wherein said smaller isolated conductive metal electrodes have different effective areas.

3. The mica film of claim 2 wherein said smaller isolated electrode areas are arranged such that changes in the orientation of said mica sheet upon said stack bring active electrode surfaces of different areas into contact with said interconnecting conductor and said electrode surface.

References Cited

UNITED STATES PATENTS

| | | | |
|---|---|---|---|
| 1,334,140 | 3/1920 | Dublier | 317—261 |
| 2,968,752 | 1/1961 | Rubinstein | 317—261 |
| 3,229,173 | 1/1966 | McHugh | 317—261 |

FOREIGN PATENTS

| | | |
|---|---|---|
| 961,661 | 4/1950 | France. |

LARAMIE E. ASKIN, *Primary Examiner.*

E. GOLDBERG, *Assistant Examiner.*